(12) United States Patent
Chung

(10) Patent No.: US 9,322,497 B1
(45) Date of Patent: Apr. 26, 2016

(54) CONNECTOR ASSEMBLY FOR GAS APPLIANCES

(71) Applicant: Chiu-Chih Chung, Changhua (TW)

(72) Inventor: Chiu-Chih Chung, Changhua (TW)

(73) Assignee: Chiu-Chih Chung, Changhua (TW)

( * ) Notice: Subject to any disclaimer, the term of this patent is extended or adjusted under 35 U.S.C. 154(b) by 79 days.

(21) Appl. No.: 14/509,078

(22) Filed: Oct. 8, 2014

(51) Int. Cl.
*F16L 27/08* (2006.01)
*F16L 21/035* (2006.01)
*F16L 21/08* (2006.01)

(52) U.S. Cl.
CPC ............ *F16L 27/0849* (2013.01); *F16L 21/035* (2013.01); *F16L 21/08* (2013.01)

(58) Field of Classification Search
CPC .............. F16L 27/0828; F16L 27/0845; F16L 27/0824; F16L 27/0837; F16L 27/0861; F16C 19/08; F16C 13/006
See application file for complete search history.

(56) References Cited

U.S. PATENT DOCUMENTS

| | | | | |
|---|---|---|---|---|
| 991,501 A * | 5/1911 | graves | ............... | F16L 27/0845 285/147.1 |
| 1,938,829 A * | 12/1933 | Hamer | ............... | F16L 27/0861 138/120 |
| 2,745,682 A * | 5/1956 | Chevallier | ............ | F16L 27/0845 285/148.15 |
| 3,858,601 A * | 1/1975 | Ensinger | ............. | F16L 27/0861 137/374 |
| 4,615,547 A * | 10/1986 | Sutcliffe | ............. | F16L 27/0861 285/121.6 |
| 4,693,500 A * | 9/1987 | Anderson | ........... | F16L 27/0828 285/276 |
| 5,178,422 A * | 1/1993 | Sekerchak | ............. | F16L 27/08 126/38 |
| 5,478,121 A * | 12/1995 | Foti | ..................... | F16L 27/0861 137/613 |
| 5,538,296 A * | 7/1996 | Horton | ................ | F16L 27/0824 285/276 |
| 5,553,893 A * | 9/1996 | Foti | ..................... | F16L 27/0861 137/613 |
| 6,550,817 B1 * | 4/2003 | Mitchell | ............. | F16L 27/0837 285/147.1 |
| 8,146,954 B2 * | 4/2012 | Su | ....................... | F16C 11/0619 285/261 |
| 8,870,233 B2 * | 10/2014 | Matzner | ................. | F16C 19/08 285/276 |

* cited by examiner

*Primary Examiner* — Rodney Mintz
*Assistant Examiner* — Daniel Kenny
(74) *Attorney, Agent, or Firm* — Yuwen Guo

(57) ABSTRACT

A connector assembly for gas appliances is disclosed. The connector assembly may be used in pairs and the composite hose may be fluidly connected therebetween. It may include two rotating direction. That is, the first screw pipe may rotate relative to the first pipe portion of the connecting pipe in the first rotating direction, and the second screw pipe may rotate relative to the second pipe portion of the connecting pipe in the second rotating direction which is different from the first rotating direction. It is easy to move the gas appliance relative to the gas supply and then prevents from gas leakage which results from the composite hose being twisted many times.

4 Claims, 6 Drawing Sheets

CONNECTOR ASSEMBLY FOR GAS APPLIANCES

FIELD OF THE INVENTION

The present invention relates to a connector, and more particularly to a connector assembly for gas appliances.

BACKGROUND OF THE INVENTION

Commercial gas fired appliances, such as fryers, ranges and stoves, used in restaurants and other commercial and institutional kitchens, must be moved frequently to permit cleaning beneath and behind them as well as for enabling maintenance, repairs and inspections. Such appliances can weigh several hundred pounds and are equipped with casters to facilitate movement.

Connectors for delivering gas to commercial gas fired appliances have been constructed to permit movement without disconnecting the gas supply lines. One proposal was to construct the connector from lengths of rigid pipe connected together by relatively rotatable sealed swivel joints so that the pipe assembly was flexed and straightened and the appliance moved toward and away from its normal operating location.

Even though the pipe assemblies were capable of flexure during appliance movements the assemblies rigidly resisted movements in certain directions. When appliances turned during movement, bending and wrenching moments were exerted on the pipes and the swivel joints.

Please reference to U.S. Pat. No. 5,553,893. In order to improve above drawback, a connector for delivering combustion gas to a gas fired appliance from a stationary supply line where the appliance moves toward and away from the supply line with the connector straightening and flexing between them as the appliance moves. The connector comprises a flexible hose assembly and first and second swivel fittings at respective hose assembly ends. Each swivel fitting defines a gas flow path and comprises a swivel member for communicating the connector with the appliance or the supply line. The hose assembly comprises a flexible metal hose member antitorsion fittings forming ends of the hose assembly connected to respective swivel fittings. The antitorsion fittings comprise pintle and nipple members rotatable relative to each other to prevent torsional stress in the hose member when the appliance moves relative to the supply line.

However, the structure is complicated and the operation is inconvenient. Furthermore, it has only one rotating direction and easy to result in gas leakage after the hose is twisted many times.

SUMMARY OF THE INVENTION

An objective of this invention is providing a connector assembly for gas appliances. The connector assembly may be used in pairs and the composite hose may be fluidly connected therebetween. It may include two rotating direction. That is, the first screw pipe may rotate relative to the first pipe portion of the connecting pipe in the first rotating direction, and the second screw pipe may rotate relative to the second pipe portion of the connecting pipe in the second rotating direction which is different from the first rotating direction. It is easy to move the gas appliance relative to the gas supply and then prevents from gas leakage which results from the composite hose being twisted many times.

To achieve above objectives, a connector assembly for gas appliances is provided. The connector assembly may comprise a connecting pipe, having a first pipe portion and a second pipe portion, the first pipe portion and the second pipe portion include a first angle therebetween and are fluidly connected with each other, a first screw hole is passed through one side of the first pipe portion adjacent to the second pipe portion, a second screw hole is passed through one side of the second pipe portion adjacent to the first pipe portion, the first screw hole is provided for detachably screwing a first bolt, and the second screw hole is provided for detachably screwing a second bolt; a first screw pipe, having a lower pipe section, a first screw nut section, and a first upper pipe section, two ends of the first screw nut section are respectively fluidly connected to the lower pipe section and the first upper pipe section, at least one first concave ring portion and a first ring groove portion are arranged at outside of the lower pipe portion, a first ring shoulder portion is arranged at bottom of the lower pipe section, the lower pipe portion is disposed inside the first pipe portion, a first sealing ring is covered the at least one first concave ring portion, a first upper spacer is surrounded the first ring shoulder portion, a first lower spacer is arranged between the bottom of the lower pipe section and the first pipe portion to make tight connection and air proof between inside of the first pipe portion and the lower pipe section, a first outer threaded portion is arranged at outside of the first upper pipe portion, the first ring groove portion is arranged corresponding to the first screw hole and provided for receiving a plurality of first balls, the first bolt is against the first balls to move and then the first screw pipe is rotatably arranged relative to the first pipe portion; and a second screw pipe, having a second screw nut section and a second upper pipe section, the second screw nut section and the second upper pipe section are included a second angle therebetween and fluidly connected with each other, an inner threaded portion is formed at inside of the second screw nut section, at least one second concave ring portion and a second ring groove portion are arranged at outside of the second upper pipe section, a second ring shoulder portion is arranged at the top of the second upper pipe section, the second upper pipe section is arranged inside the second pipe portion, a second sealing ring is covered the at least one second concave ring portion, a second lower spacer is surrounding the second ring shoulder portion, a second upper spacer is arranged between the top of the second upper pipe section and the second pipe portion to make tight connection and air proof between inside of the second pipe portion and the second upper pipe section, the second ring groove portion is arranged corresponding to the second screw hole and provided for receiving a plurality of second balls, the second bolt is against the second balls to move and then the second screw pipe is rotatably arranged relative to the second pipe portion.

In one embodiment, the first angle is an obtuse angle.

In another embodiment, a first concave groove is arranged at one side of the first screw hole, a second concave groove is arranged at one side of the second screw hole, the first concave groove and the second concave groove are respectively provided for plugging a first stopper and a second stopper to prevent from gas leakage.

In one embodiment, the second angle is an acute angle.

Further features and advantages of the present invention will become apparent to those of skill in the art in view of the detailed description of preferred embodiments which follows, when considered together with the attached drawings and claims.

BRIEF DESCRIPTION OF THE DRAWINGS

All the objects, advantages, and novel features of the invention will become more apparent from the following detailed descriptions when taken in conjunction with the accompanying drawings.

DESCRIPTION OF THE PREFERRED EMBODIMENT

Figure 1:
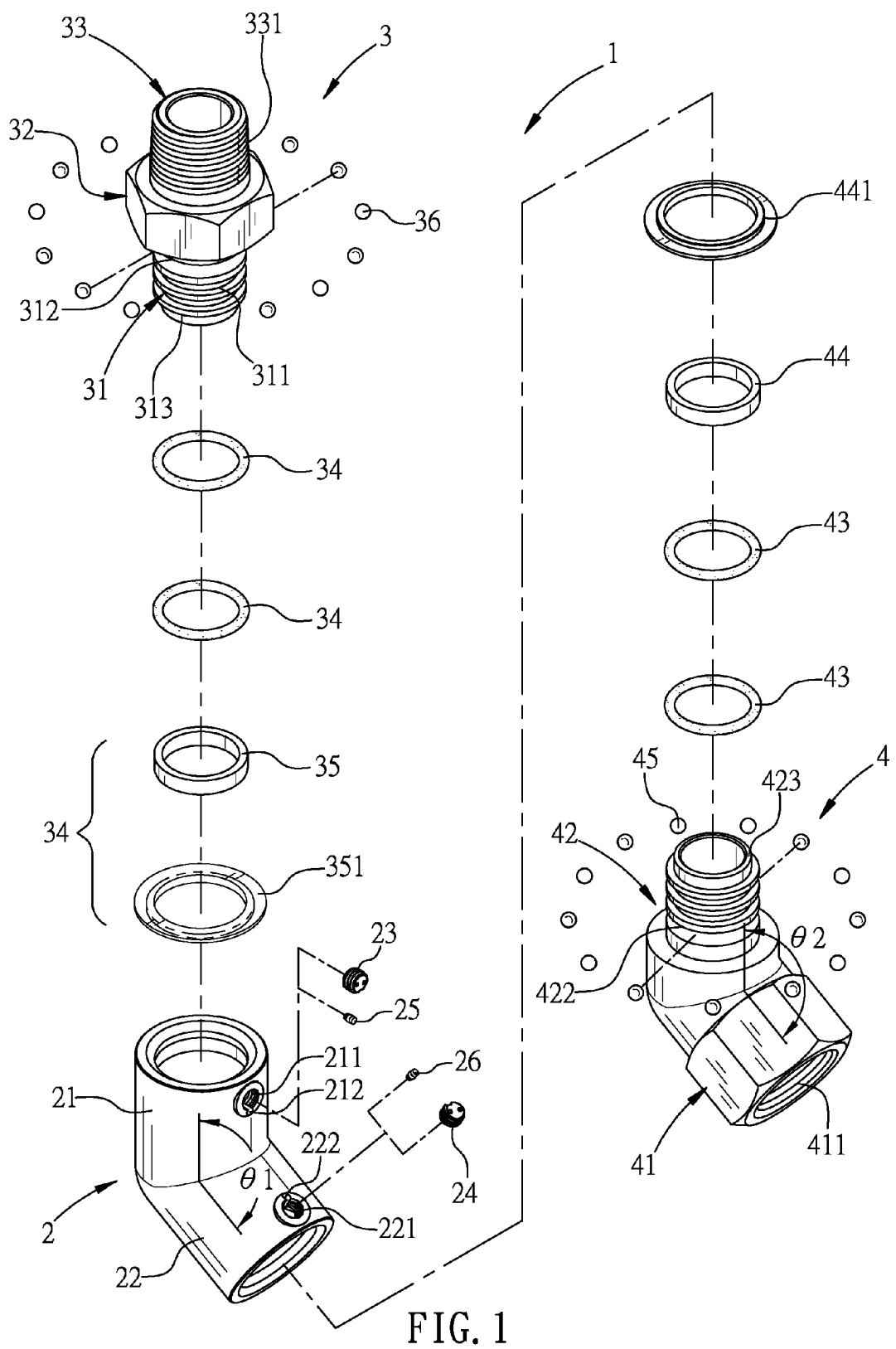
FIG. 1 is an exploded view of a connector assembly according to this present invention.

Referring now to the drawings where like characteristics and features among the various figures are denoted by like reference characters.

Figure 2:
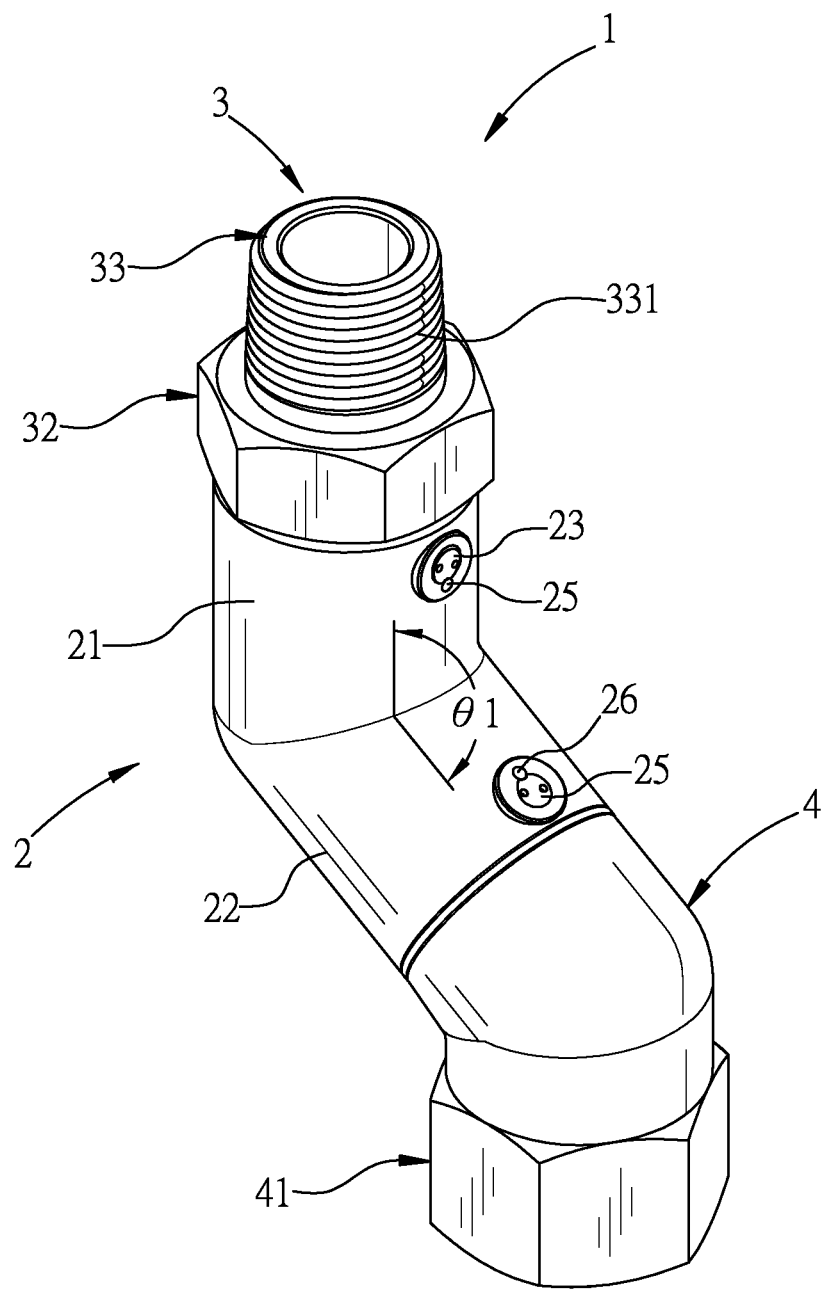
FIG. 2 is an outside view of the connector assembly according to this present invention.
Figure 3:
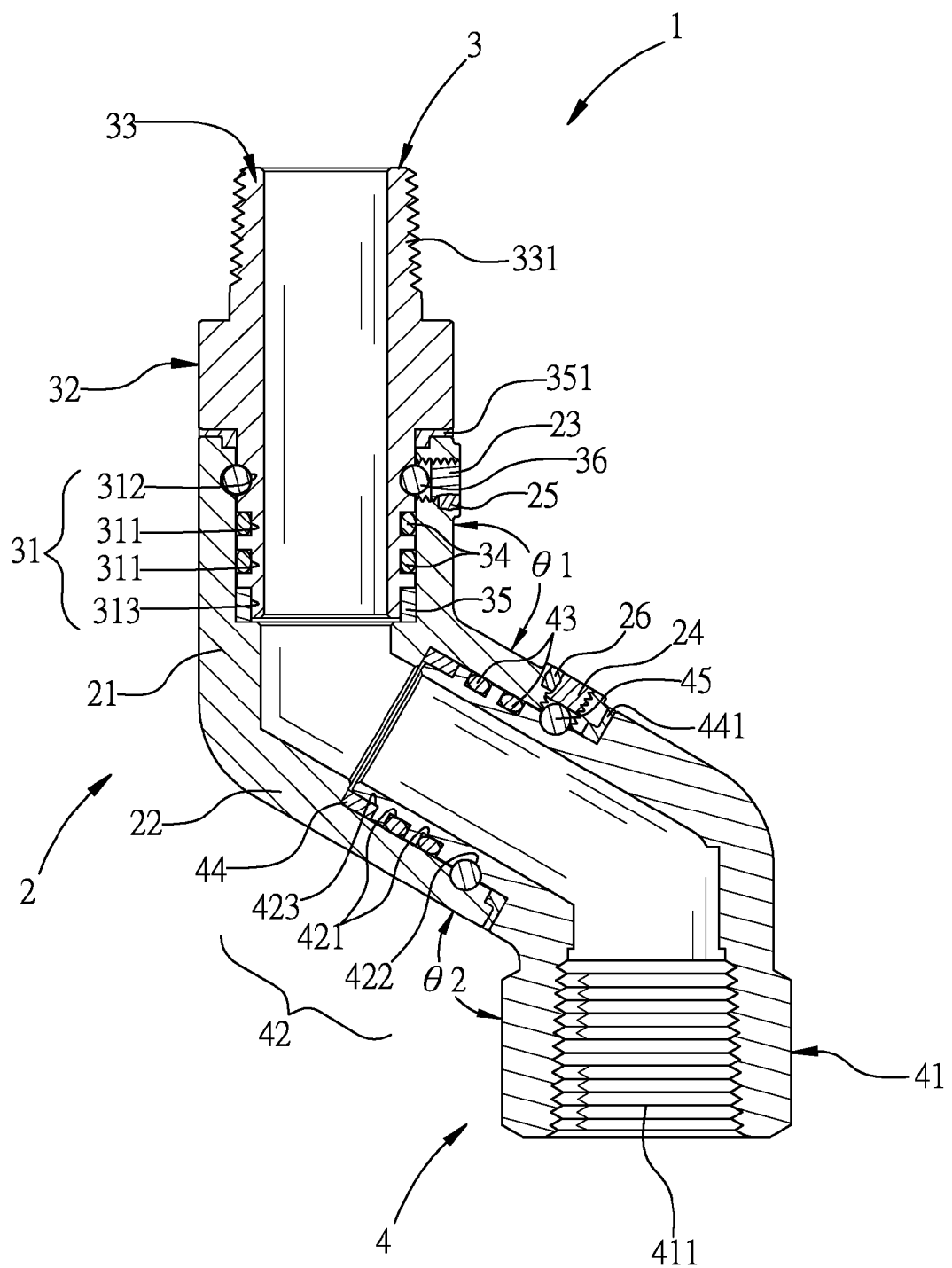
FIG. 3 is a sectional view of the connector assembly according to this present invention.
Figure 4:
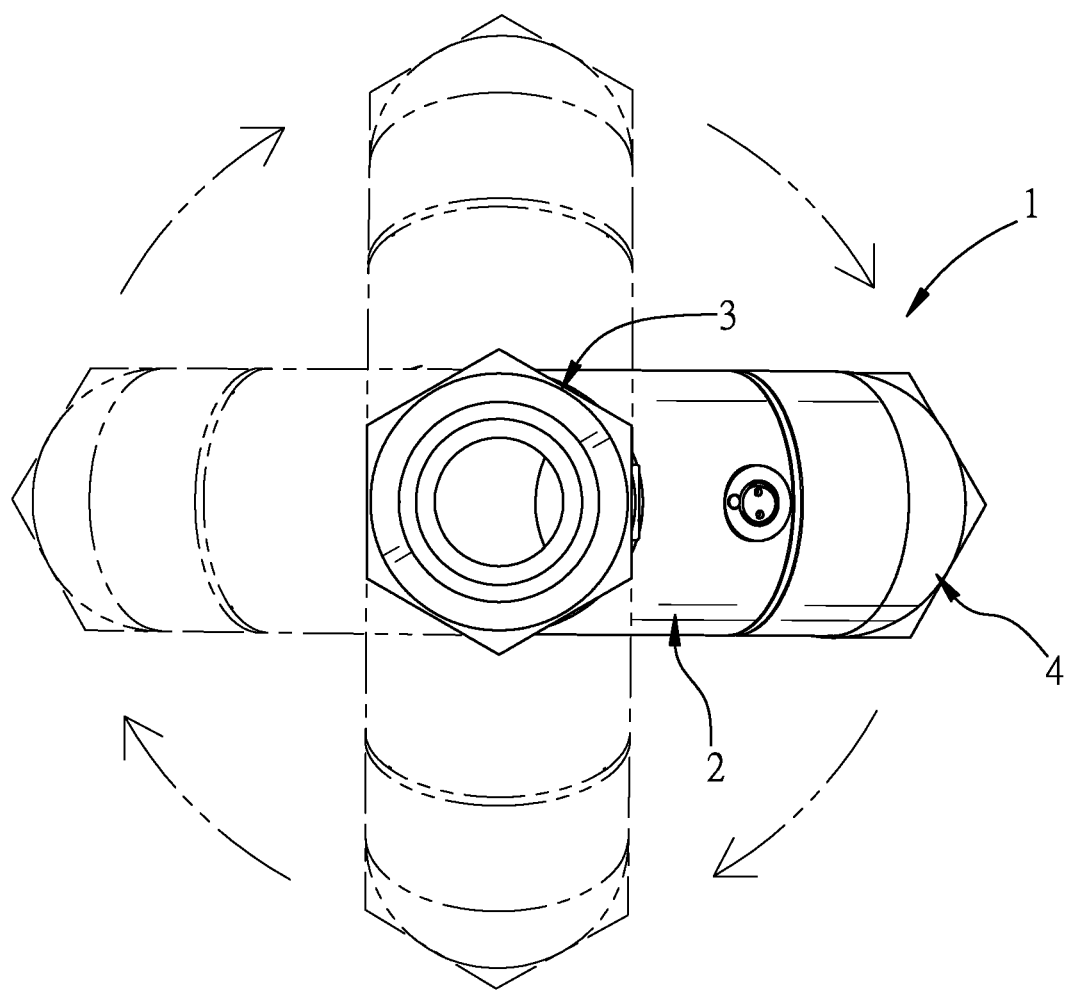
FIG. 4 is a perspective view of the connector assembly according to this present invention while the first screw pipe rotates relative to the first pipe portion.
Figure 5:
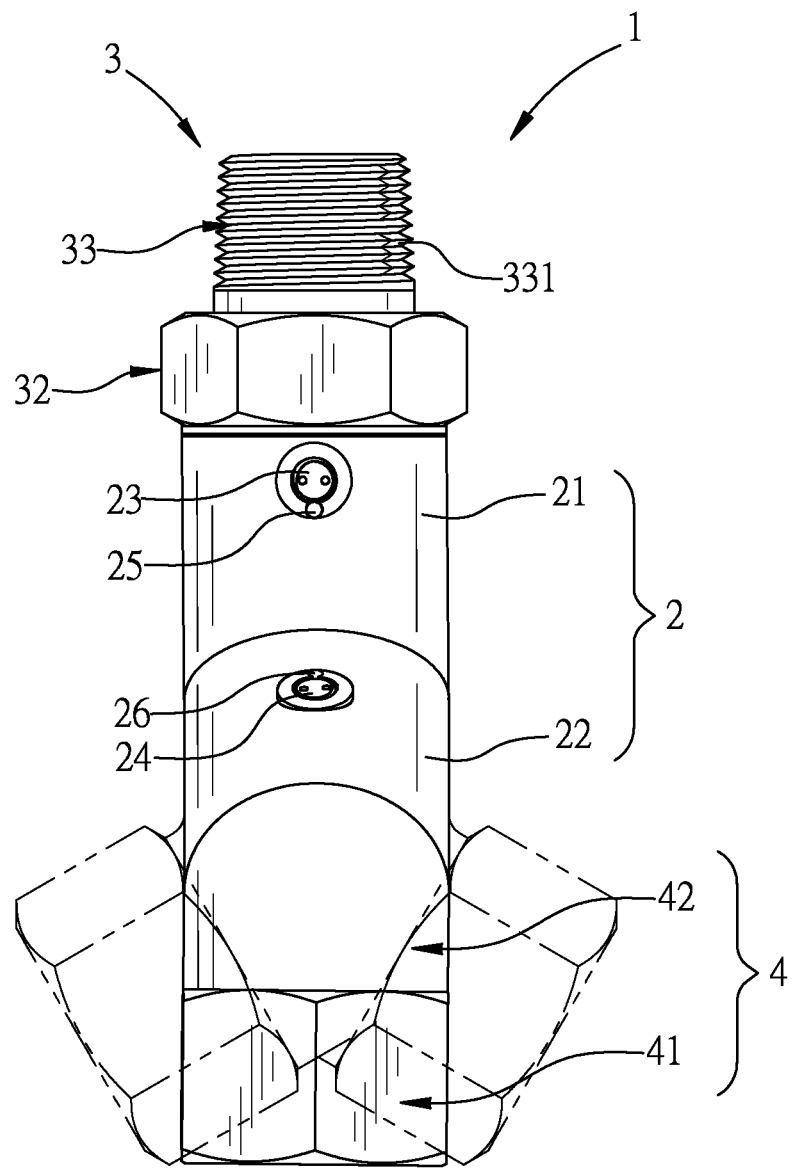
FIG. 5 is a perspective view of the connector assembly according to this present invention while the second screw pipe rotates relative to the second pipe portion.
Figure 6:
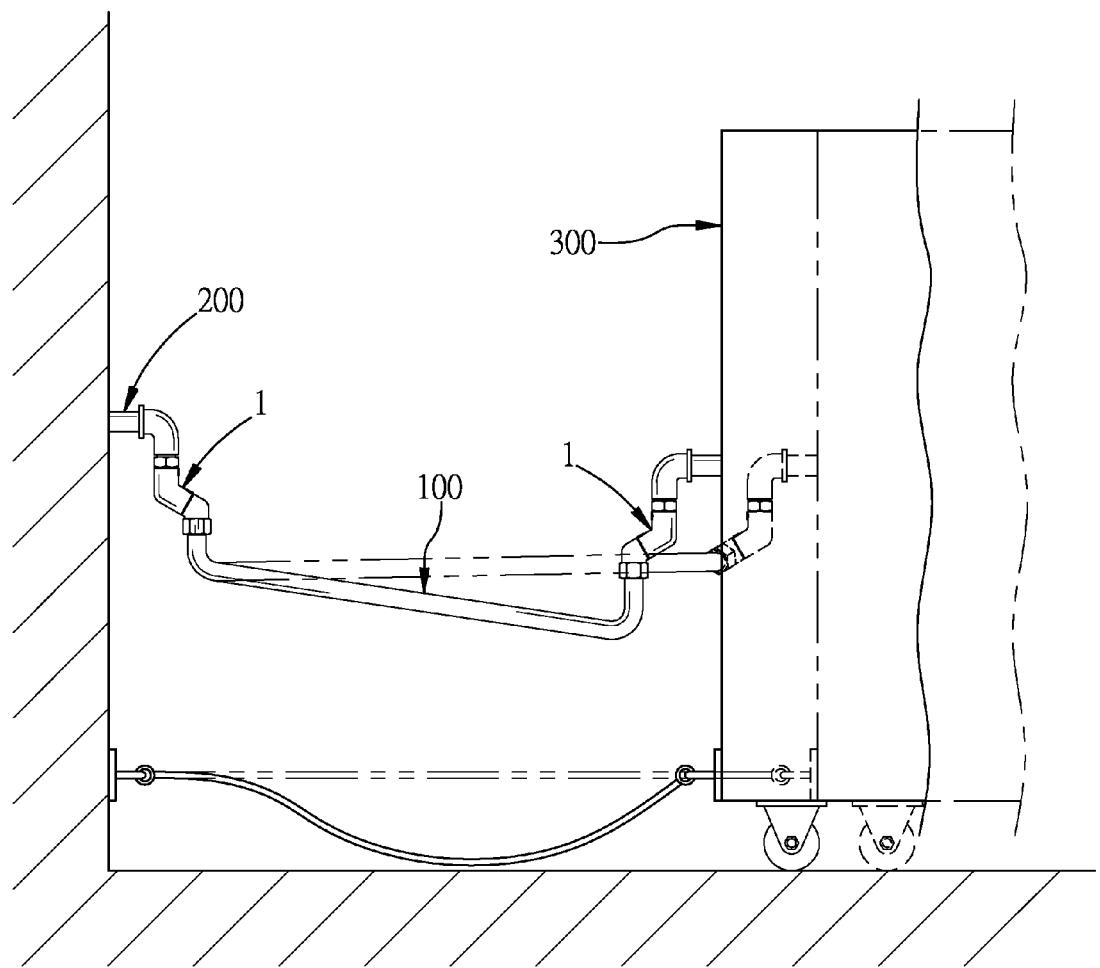
FIG. 6 is a view of the spring tension control of the connector assembly according to this present invention while being used at a gas appliance.

FIG. 1 is an exploded view of a connector assembly according to this present invention. FIG. 2 is an outside view of the connector assembly according to this present invention. FIG. 3 is a sectional view of the connector assembly according to this present invention. FIG. 4 is a perspective view of the connector assembly according to this present invention while the first screw pipe rotates relative to the first pipe portion. FIG. 5 is a perspective view of the connector assembly according to this present invention while the second screw pipe rotates relative to the second pipe portion. FIG. 6 is a view of the spring tension control of the connector assembly according to this present invention while being used at a gas appliance.

Please refer to FIGS. 1 and 6, the connector assembly 1 of this invention may comprise a connecting pipe 2, a first screw pipe 3, and a second screw pipe 4.

The connecting pipe 2 may have a first pipe portion 21 and a second pipe portion 22. The first pipe portion 21 and the second pipe portion 22 may include a first angle θ1 therebetween and are fluidly connected with each other. The first angle θ1 may be an obtuse angle, but not limited thereto. A first screw hole 211 may be passed through one side of the first pipe portion 21 adjacent to the second pipe portion 22. A second screw hole 221 may be passed through one side of the second pipe portion 22 adjacent to the first pipe portion 21. The first screw hole 211 may be provided for detachably screwing a first bolt 23 and the second screw hole 221 may be provided for detachably screwing a second bolt 24.

A first concave groove 212 may be arranged at one side of the first screw hole 211 and a second concave groove 222 may be arranged at one side of the second screw hole 221. The first concave groove 212 and the second concave groove 222 may be respectively provided for plugging a first stopper 25 and a second stopper 26 to prevent from gas leakage.

The first screw pipe 3 may have a lower pipe section 31, a first screw nut section 32, and a first upper pipe section 33. Two ends of the first screw nut section 32 may be respectively fluidly connected to the lower pipe section 31 and the first upper pipe section 33. At least one first concave ring portion 311 (two for illustration, but not limited thereto) and a first ring groove portion 312 may be arranged at outside of the lower pipe portion 31. A first ring shoulder portion 313 may be arranged at bottom of the lower pipe section 31. The lower pipe portion 31 may be disposed inside the first pipe portion 21. A first sealing ring 34 may be covered each first concave ring portion 311. A first upper spacer 35 may be rounded the first ring shoulder portion 313. A first lower spacer 351 may be arranged between the bottom of the lower pipe section 31 and the first pipe portion 21 to make tight connection and air proof between inside of the first pipe portion 21 and the lower pipe section 31. A first outer threaded portion 331 may be arranged at outside of the first upper pipe portion 33. The first ring groove portion 312 may be arranged corresponding to the first screw hole 211 and provided for receiving a plurality of first balls 36. The first bolt 23 may be against the first balls 36 to move and then the first screw pipe 3 may be rotatably arranged relative to the first pipe portion 21 (first rotating direction).

The second screw pipe 4 may have a second screw nut section 41 and a second upper pipe section 42. The second screw nut section 41 and the second upper pipe section 42 may be included a second angle θ2 therebetween and fluidly connected with each other. The second angle θ2 may be an acute angle, but not limited thereto. An inner threaded portion 411 may be formed at inside of the second screw nut section 41. At least one second concave ring portion 421 (two for illustration, but not limited thereto) and a second ring groove portion 422 may be arranged at outside of the second upper pipe section 42. A second ring shoulder portion 423 may be arranged at the top of the second upper pipe section 42. The second upper pipe section 42 may be arranged inside the second pipe portion 22. A second sealing ring 43 may be covered each second concave ring portion 421. A second lower spacer 44 may be surrounding the second ring shoulder portion 423. A second upper spacer 441 may be arranged between the top of the second upper pipe section 42 and the second pipe portion 22 to make tight connection and air proof between inside of the second pipe portion 22 and the second upper pipe section 42. The second ring groove portion 422 may be arranged corresponding to the second screw hole 221 and provided for receiving a plurality of second balls 45. The second bolt 23 may be against the second balls 45 to move and then the second screw pipe 4 may be rotatably arranged relative to the second pipe portion 22 (second rotating direction, which is different from the first rotating direction).

The connector assembly 1 must be used in pairs. One of the connector assemblies 1 may fluidly connect with a gas supply 200 and the other may connect with a gas appliance 300. Two ends of a composite hose 100 may respectively fluidly connect to those two connector assemblies 1, shown as in FIG. 6.

Therefore, the connector assembly 1 is used in pairs and the composite hose 100 is fluidly connected therebetween. It may include two rotating direction. That is, the first screw pipe 3 may rotate relative to the first pipe portion 21 of the connecting pipe 2 in the first rotating direction, and the second screw pipe 4 may rotate relative to the second pipe portion 22 of the connecting pipe 2 in the second rotating direction which is different from the first rotating direction. It is easy to move the gas appliance 300 relative to the gas supply 200 and then prevents from gas leakage which results from the composite hose 100 being twisted many times.

What is claimed is:

1. A connector assembly for gas appliances, comprising:
a connecting pipe, having a first pipe portion and a second pipe portion, the first pipe portion and the second pipe portion include a first angle therebetween and are fluidly connected with each other, a first screw hole is passed through one side of the first pipe portion adjacent to the second pipe portion, a second screw hole is passed through one side of the second pipe portion adjacent to the first pipe portion, the first screw hole is provided for detachably screwing a first bolt, and the second screw hole is provided for detachably screwing a second bolt;

a first screw pipe, having a lower pipe section, a first screw nut section, and a first upper pipe section, two ends of the first screw nut section are respectively fluidly connected to the lower pipe section and the first upper pipe section, at least one first concave ring portion and a first ring groove portion are arranged at outside of the lower pipe portion, a first ring shoulder portion is arranged at bottom of the lower pipe section, the lower pipe portion is disposed inside the first pipe portion, a first sealing ring is covered the at least one first concave ring portion, a first upper spacer is surrounded the first ring shoulder portion, a first lower spacer is arranged between the bottom of the lower pipe section and the first pipe portion to make tight connection and air proof between inside of the first pipe portion and the lower pipe section, a first outer threaded portion is arranged at outside of the first upper pipe portion, the first ring groove portion is arranged corresponding to the first screw hole and provided for receiving a plurality of first balls, the first bolt is against the first balls to move and then the first screw pipe is rotatably arranged relative to the first pipe portion; and a second screw pipe, having a second screw nut section and a second upper pipe section, the second screw nut section and the second upper pipe section are included a second angle therebetween and fluidly connected with each other, an inner threaded portion is formed at inside of the second screw nut section, at least one second concave ring portion and a second ring groove portion are arranged at outside of the second upper pipe section, a second ring shoulder portion is arranged at the top of the second upper pipe section, the second upper pipe section is arranged inside the second pipe portion, a second sealing ring is covered the at least one second concave ring portion, a second lower spacer is surrounding the second ring shoulder portion, a second upper spacer is arranged between the top of the second upper pipe section and the second pipe portion to make tight connection and air proof between inside of the second pipe portion and the second upper pipe section, the second ring groove portion is arranged corresponding to the second screw hole and provided for receiving a plurality of second balls, the second bolt is against the second balls to move and then the second screw pipe is rotatably arranged relative to the second pipe portion.

2. The connector assembly as claimed in claim 1, wherein the first angle is an obtuse angle.

3. The connector assembly as claimed in claim 1, wherein a first concave groove is arranged at one side of the first screw hole, a second concave groove is arranged at one side of the second screw hole, the first concave groove and the second concave groove are respectively provided for plugging a first stopper and a second stopper to prevent from gas leakage.

4. The connector assembly as claimed in claim 1, wherein the second angle is an acute angle.

\* \* \* \* \*